(12) United States Patent
Mirek et al.

(10) Patent No.: US 7,654,808 B2
(45) Date of Patent: Feb. 2, 2010

(54) AIR RING WITH CIRCUMFERENTIALLY ADJUSTABLE AIR FLOW

(75) Inventors: Planeta Mirek, Mississauga (CA); Dang Nghia, Mississauga (CA); Sachdev Narendra, Brampton (CA)

(73) Assignee: Macro Engineering and Technology, Inc. (CA)

( * ) Notice: Subject to any disclaimer, the term of this patent is extended or adjusted under 35 U.S.C. 154(b) by 447 days.

(21) Appl. No.: 11/544,575

(22) Filed: Oct. 10, 2006

(65) Prior Publication Data

US 2007/0098834 A1    May 3, 2007

Related U.S. Application Data

(63) Continuation-in-part of application No. 11/246,196, filed on Oct. 11, 2005, now abandoned.

(60) Provisional application No. 60/617,030, filed on Oct. 12, 2004.

(51) Int. Cl.
  *B29C 47/90* (2006.01)
(52) U.S. Cl. .................... 425/72.1; 425/326.1
(58) Field of Classification Search ............... 425/72.1, 425/326.1, 380, 467
  See application file for complete search history.

(56) References Cited

U.S. PATENT DOCUMENTS

| | | | |
|---|---|---|---|
| 4,145,177 A * | 3/1979 | Schott, Jr. ................... | 425/445 |
| 4,272,231 A * | 6/1981 | Schott, Jr. ................... | 425/72.1 |
| 4,443,400 A | 4/1984 | Herrington | |
| 4,632,801 A | 12/1986 | Dowd | |
| 4,749,346 A | 6/1988 | Planeta | |
| 4,750,874 A * | 6/1988 | Keim ........................ | 425/72.1 |
| 4,826,414 A | 5/1989 | Planeta | |
| 4,834,924 A | 5/1989 | D'Annunzio et al. | |
| 5,281,375 A | 1/1994 | Konerman | |
| 6,739,855 B2 | 5/2004 | Randolph et al. | |
| 6,783,344 B1 * | 8/2004 | Rudolf ....................... | 425/72.1 |

* cited by examiner

*Primary Examiner*—Robert B Davis
*Assistant Examiner*—Joseph Leyson
(74) *Attorney, Agent, or Firm*—Steven M. Greenberg, Esq.; Carey, Rodriguez, Greenberg & Paul, LLP

(57) ABSTRACT

An air ring for supplying cooling air to a hot extruded plastic film after extrusion from an annular extrusion die has an annular body surrounding the emerging tubular plastic film. The annular body has an annular plenum chamber receiving air from an external source. A circumferentially extending series of separate air passages receives air from the plenum chamber and extends radially inwardly to respective separate orifices adjacent to and surrounding the tubular film. Separate adjustors individually control the air flow from the plenum chamber to respective air passages and associated orifices, whereby air flow from each orifice impinges on a discrete circumferentially extending portion of the tubular film substantially independently of air flow from other orifices. Each adjustor controls air flow to only one orifice. The plenum chamber also supplies air through an annular passage in the annular body to an annular orifice adjacent to and surrounding the tubular film.

5 Claims, 5 Drawing Sheets

AIR RING WITH CIRCUMFERENTIALLY ADJUSTABLE AIR FLOW

RELATED APPLICATIONS

This application is a continuation in part of U.S. patent application Ser. No. 11/246,196 filed Oct. 11, 2005, now abandoned, which claims priority from U.S. Provisional Patent Application No. 60/617,030 filed Oct. 12, 2004.

FIELD OF INVENTION

This invention relates to air rings for supplying cooling air to a hot extruded plastic film after the film has been extruded from an annular extrusion die.

BACKGROUND OF INVENTION

Many different types of air rings have been proposed in the past, see for example U.S. Pat. No. 5,804,221 (Planeta et al.) issued Sep. 8, 1998, the contents of which are hereby incorporated herein by reference, which describes controlling air flow at different circumferential locations to adjust the gauge (thickness) of the extruded film. Another proposal is described in U.S. Pat. No. 6,739,855 (Randolph et al.) issued May 21, 2004. However, because of ever increasing need for high quality film made from different plastic materials with different physical properties, there is a requirement for improved airflow control at different circumferential locations.

It is therefore an object of the invention to provide an air ring which enables air flow at different circumferential locations to be controlled in an improved manner.

SUMMARY OF INVENTION

According to the invention, an air ring for supplying cooling air to a hot extruded plastic film after the film has been extruded from an annular extrusion die at an elevated temperature as an annular body which in use surrounds the hot tubular plastic film after the film has left the extrusion die, said annular body having an annular plenum chamber to which air is supplied from an external source,

- a circumferentially extending series of separate air passages communicating with the plenum chamber for receiving cooling air therefrom and extending radially inwardly to respective separate orifices which in use of the air ring are adjacent to and surround the hot tubular film, and
- separate adjustors for individually controlling the flow of air from the plenum chamber to respective air passages and associated orifices, whereby air flow from each orifice impinges on a discrete circumferentially extending portion of the tubular film in a manner substantially independently of air flow from the other orifices, each adjustor controlling air flow to one of said separate orifices only, and;
- the plenum chamber also supplying air through an annular passage in the annular body to an annular orifice which in use of the air ring is adjacent to and surrounds the tubular film.

An air ring in accordance with the present invention enables the gauge (thickness) of the film to be adjusted at any particular circumferential location by appropriately controlling the relevant adjustor to vary the air flow to the orifice concerned without having any substantial effect on cooling air flow from the annular orifice.

The plenum chamber may supply air through the annular passage to two annular orifices which in use of the air ring are adjacent to and surround the hot tubular film.

A circumferentially extending series of radially inwardly directed attachments may be secured to the underside of the annular body, the attachments cooperating with the annular body to form the air passage, the annular body having a circumferentially extending series of apertures in the bottom thereof providing communication between the plenum chamber and the air passage, the associated adjustor having a valve slideably mounted therein adjacent the aperture whereby movement of the valve member controls the size of the aperture to vary the air flow to the associated orifice.

DESCRIPTION OF DRAWINGS

Embodiments of the invention will now be described, by way of example, with reference to the accompanying drawings, of which.

DESCRIPTION OF PREFERRED EMBODIMENTS

Figure 1:
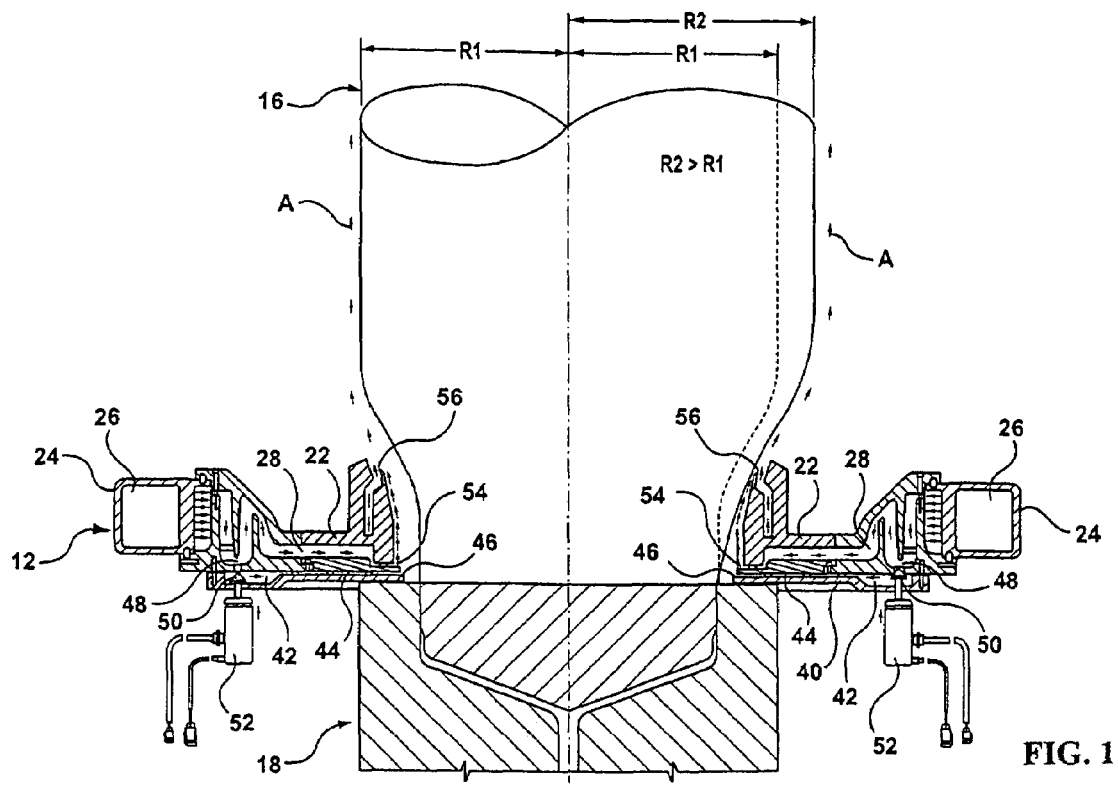
FIG. 1 is a sectional side view of tubular plastic film being extruded from an annular extrusion die and being cooled by an air ring in accordance with one embodiment of the invention.
Figure 2:
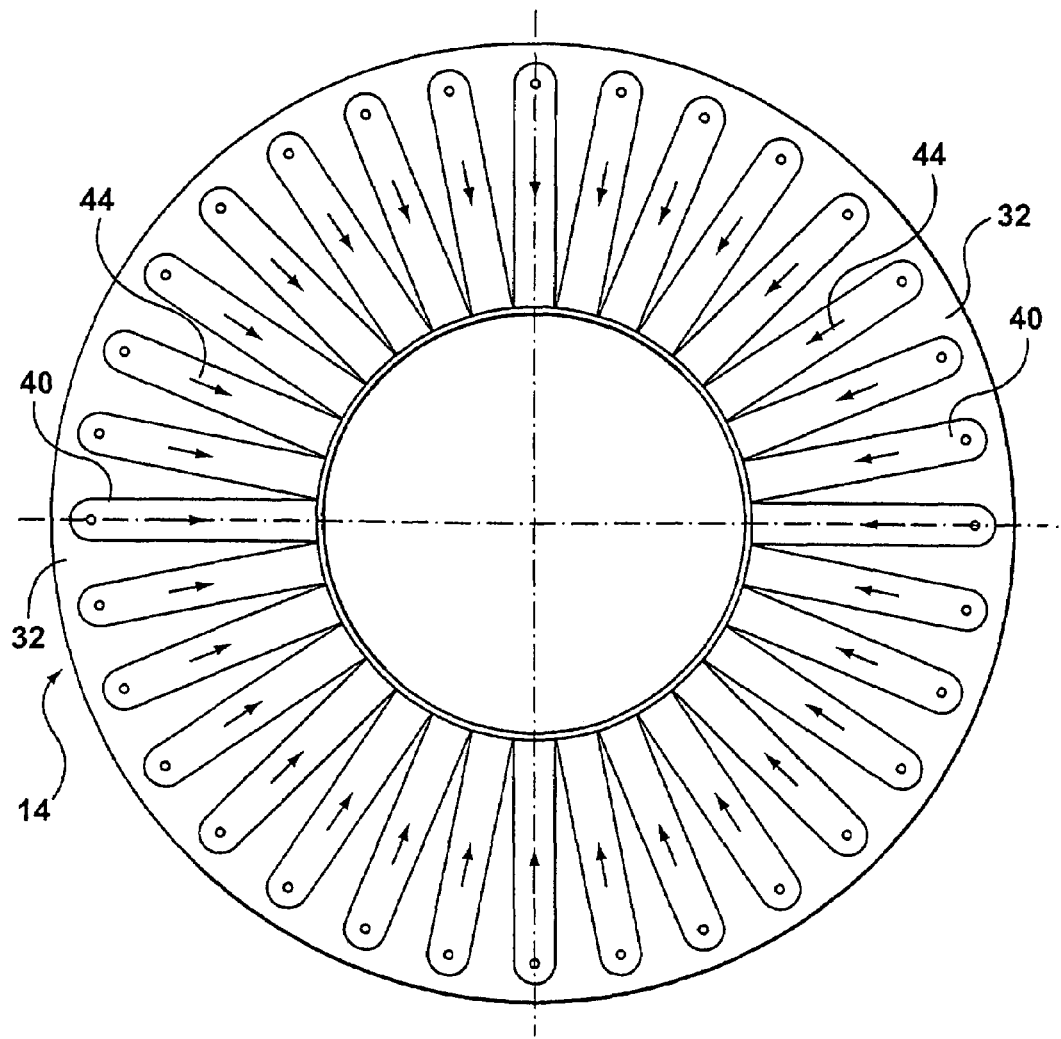
FIG. 2 is a somewhat diagrammatic bottom view of the circumferentially extending series of separate air passages of the air ring of FIG. 1.

Referring first to FIGS. 1 and 2 of the drawings, an air ring 12 in accordance with one embodiment of the invention is provided to cool tubular plastic film 16 after extrusion from an annular extrusion die 18. The air ring 12 comprises an annular body 22 having its radially inner edge portion mounted on the top of the extrusion die 18. An annular housing 24 forming a plenum chamber 26 surrounds and is secured to the radially outer edge of the annular body 22. The plenum chamber 26 is supplied with cooling air from an external source (not shown), and the cooling air passes in a radially inward direction from the plenum chamber 26 through an annular passage 28 in the air ring body 22 to a lower annular orifice 54 and an upper annular orifice 56 at its radially inner edge adjacent the tubular film 16 so that air from the orifices 54, 56 flows upwardly adjacent the film 16, as indicated by the arrows A.

A circumferentially extending series of radially inwardly directed attachments 40 are secured to the underside of the annular body 22. Each attachment 40 cooperates with the annular body 22 to form an air chamber 42 and an air passage 44 extending therefrom to an orifice 46 at the radially inner edge of the annular body 22 and the attachment 40. The annular body 22 has a circumferentially extending series of apertures 48 in the bottom thereof, each aperture 48 providing communication between the annular passage 28 and an air chamber 42. Also, each attachment 40 carries a valve member 50 slidably mounted for vertical movement therein adjacent the aperture 48. Vertical movement of each valve member 50 is controlled by a respective one of a circumferentially extending series of remotely controlled actuators 52 which operate to cause the respective valve member 50 to adjust the size of the aperture 48 and hence the amount of air passing from the annular passage 28 to the air chamber 42 and subsequently to an orifice 46. The actuators 52 may be of any suitable type, for example electric or piezoelectric motors, bimetallic actuators, solenoid coils, pressure regulators or flow valves.

Thus, the amount of cooling air flowing from each orifice 46 of the air ring 12 from annular passage 28 and the plenum chamber 26 is adjustable independently of air flow from the other orifices 54, 56 by means of the respective remotely controlled actuator 52. Such adjustment may be pre-programmed for a particular kind of film being extruded or may be automatically adjusted in response to circumferential variations in thickness of the film as sensed by an annular thickness sensor (not shown but known to persons skilled in the art). An increase in radius of the bubble 16 at any particular circumferential location from R1 to R2 as a result of adjustment of the amount of cooling air flowing from the orifice 46 causes the bubble 16 to have a thinner gauge at that location.

Thus, the gauge of the film 16 can be adjusted at any particular circumferential location by appropriately controlling the relevant actuator 52 to vary the air flow to the orifice 46 concerned without having any significant effect on cooling air flow from the annular orifices 54, 56. Further, the separate orifices 46 may be positioned very closely to the film 16 so as to be able to control the gauge thereof very accurately.

Figure 3:
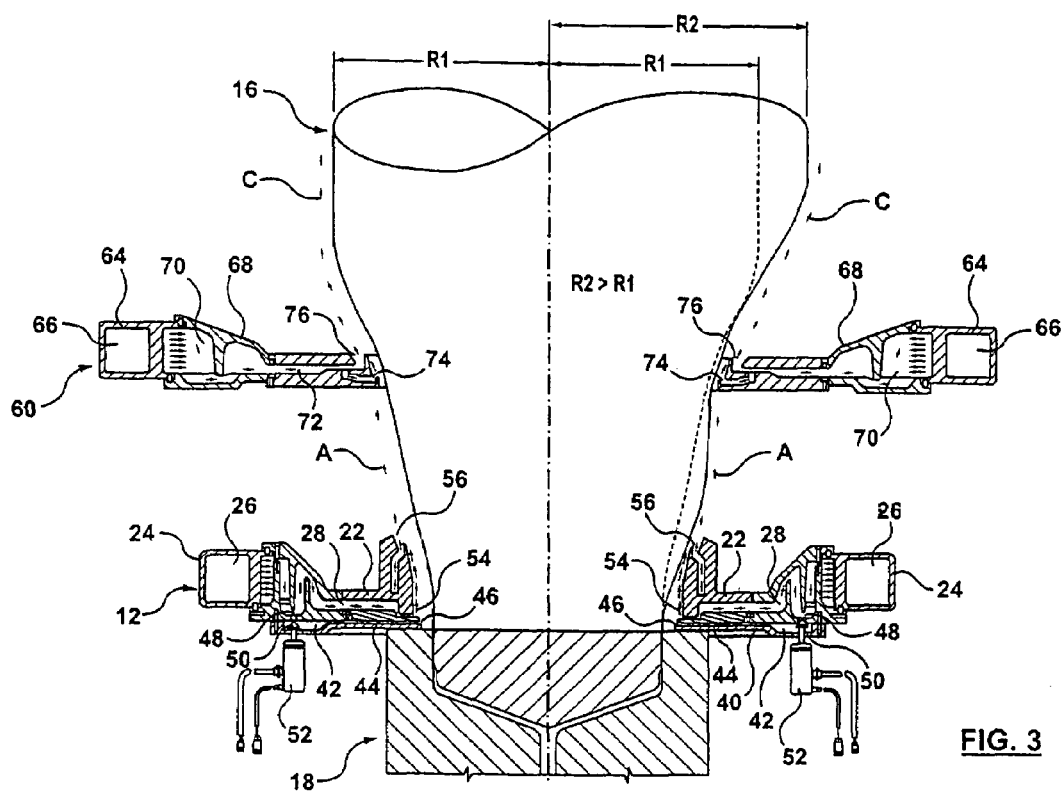
FIG. 3 is similar to FIG. 1 but also shows a secondary air ring not in accordance with the invention.

The arrangement shown in FIG. 3 is similar to that in FIG. 1, except that a secondary air ring 60 of known kind has been added. The secondary air ring 60 has an annular housing 64 providing a plenum chamber 66, and the annular body 68 has an air chamber 60 with an air passage 72 leading to two orifices 74, 76. It will be noted that cooling air from each orifice 74, 76 merges with cooling air from the primary air ring 12 to form a cooling air flow as indicated by arrows C.

Figure 4:
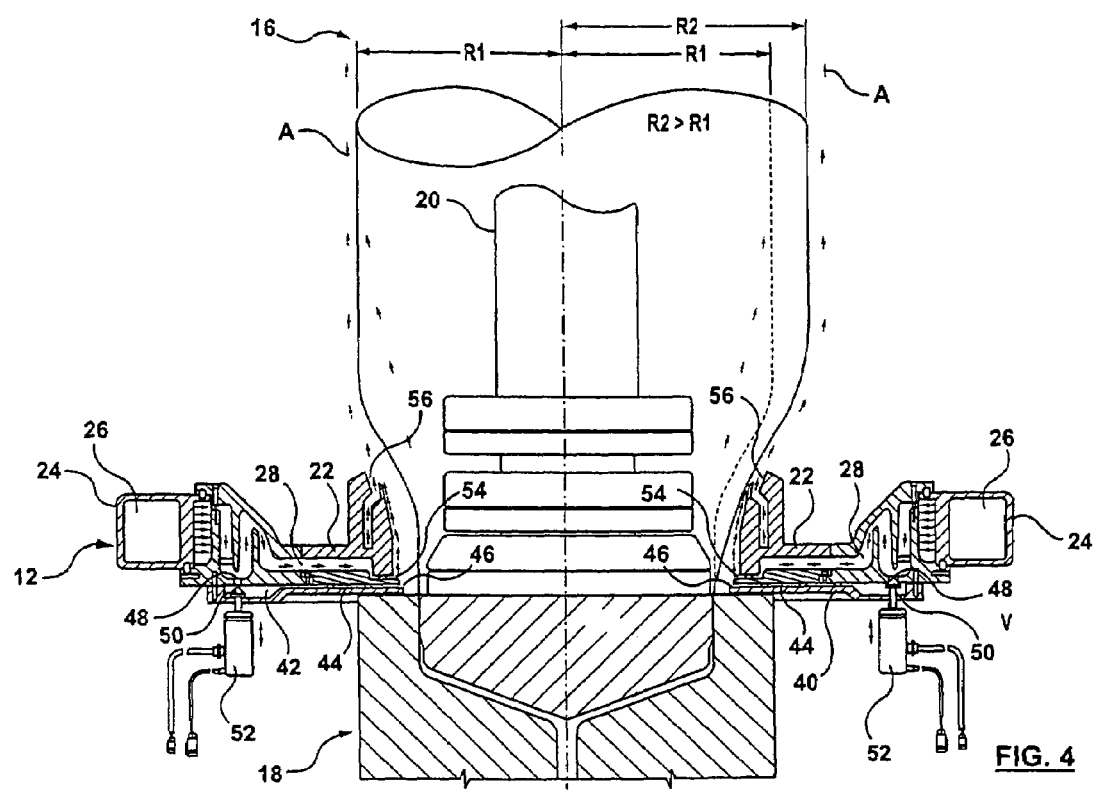
FIG. 4 is similar to FIG. 1 but also shows internal bubble cooling equipment.
Figure 5:
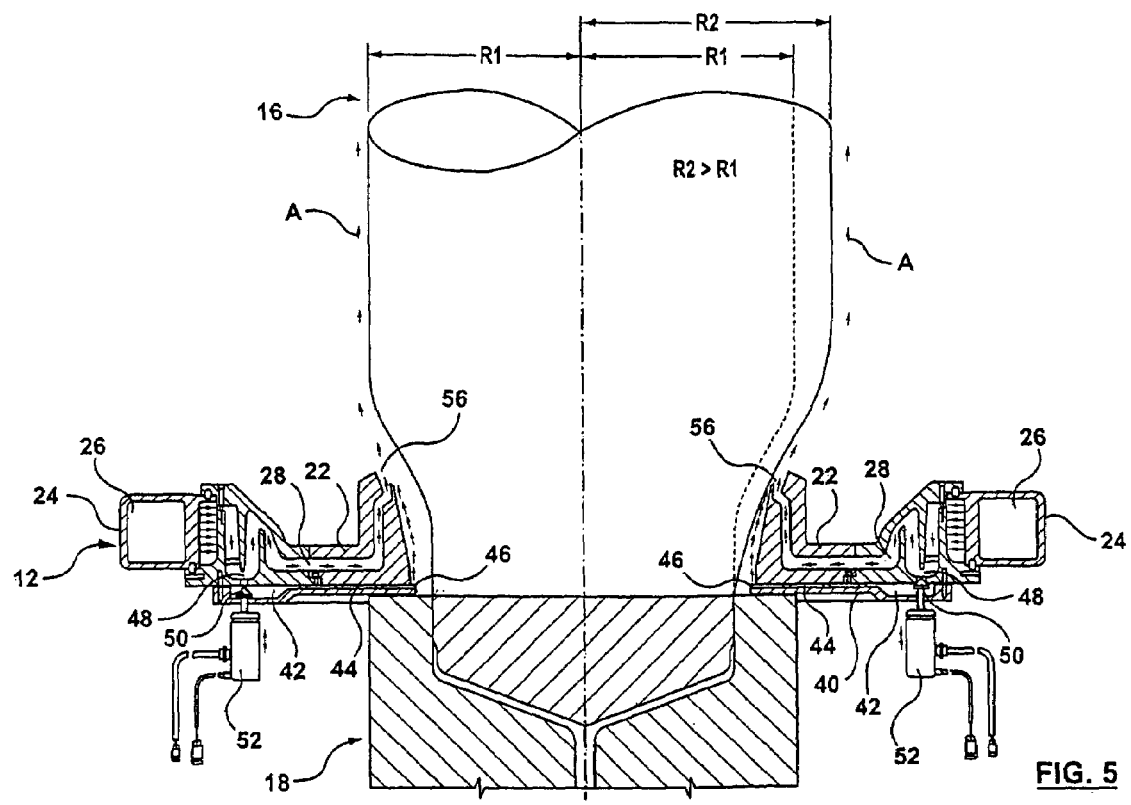
FIG. 5 is similar to FIG. 1 but shows an air ring in accordance with a second embodiment of the invention.

FIG. 4 is the same as FIG. 1, except that internal bubble cooling equipment 20 is provided. FIG. 5 is similar to FIG. 1, except that the annular orifice 54 has been omitted.

The advantages of the invention will now be readily apparent to a person skilled in the art from the foregoing description of preferred embodiments. It will be especially noted that the invention can be retrofitted to suitable existing air rings by securing attachments 40 with actuators 52 and valve member 50 thereto and providing the apertures 48 in the existing air ring. For example, as shown in the embodiments shown above, the apertures 48 may be provided in the bottom of an existing air ring, with the attachments 40 being secured to the bottom of the air ring.

The scope of the invention is defined in the appended claims.

The invention claimed is:

1. An air ring for supplying cooling air to a hot extruded plastic film after the film has been extruded from an annular extrusion die at an elevated temperature, said air ring having:
    an annular body which in use surrounds the hot tubular plastic film after the film has left the extrusion die, said annular body having an annular plenum chamber to which air is supplied from an external source and which supplies air through an annular passage in the annular body to an annular orifice which in use of the air ring is adjacent to and surrounds the tubular film;
    a series of separate air passages extending completely around the annular body and communicating with the plenum chamber for receiving cooling air therefrom, each of said separate air passages extending radially inwardly from the plenum chamber to only a single respective separate orifice, wherein in use of the air ring the separate orifices are adjacent to and completely surround the hot tubular film;
    separate remotely controlled adjustors, each adjustor being associated with a corresponding separate air passage and being positioned entirely outside the plenum chamber and the annular passage to individually control air flow from the plenum chamber to said corresponding separate air passage, each adjustor controlling air flow to only one of said separate orifices, whereby air flow from each separate orifice impinges on a discrete circumferentially extending portion of the tubular film substantially independently of air flow from the other separate orifices.

2. An air ring according to claim 1 wherein the plenum chamber supplies air through the annular passage to two annular orifices which in use of the air ring are adjacent to and surround the hot tubular film.

3. An air ring according to claim 1 wherein a circumferentially extending series of radially inwardly directed attachments are secured to the underside of the annular body, each attachment cooperating with the annular body to form a respective air passage, the annular body having a circumferentially extending series of apertures in the bottom thereof each providing communication between the plenum chamber and a respective air passage, the associated adjustor having a remotely controlled valve slideably mounted therein adjacent the aperture whereby movement of the valve member controls the size of the aperture to vary the air flow to the associated orifice.

4. An air ring for supplying cooling air to a hot extruded plastic film after the film has been extruded from an annular extrusion die at an elevated temperature, said air ring having:
    an annular body which in use surrounds the hot tubular plastic film after the film has left the extrusion die, said annular body having an annular plenum chamber to which air is supplied from an external source and which supplies air through an annular passage in the annular body to an annular orifice which in use of the air ring is adjacent to and surrounds the tubular film;
    a circumferentially extending series of radially inwardly directed attachments secured to the underside of the annular body to form a series of separate air passages extending completely around the annular body and communicating with the plenum chamber for receiving cooling air therefrom, each of said separate air passages extending radially inwardly from the plenum chamber to only a single respective separate orifice, wherein in use of the air ring the separate orifices are adjacent to and completely surround the hot tubular film;
    the annular body having a circumferentially extending series of apertures in the bottom thereof each providing communication between the plenum chamber and a respective separate air passage;
    each attachment carrying a valve member movably mounted in the attachment adjacent one of the apertures whereby movement of the valve member controls the size of the corresponding aperture to vary the air flow from the plenum chamber through said respective separate air passage to the associated separate orifice, each valve member being positioned entirely outside the plenum chamber and the annular passage to individually control air flow from the plenum chamber to only one of said separate orifices, whereby air flow from each separate orifice impinges on a discrete circumferentially extending portion of the tubular film substantially independently of air flow from the other separate orifices;

separate remotely controlled actuators, each actuator being positioned entirely outside the plenum chamber and the annular passage and operable to cause a single respective valve member to adjust the size of the respective aperture and thereby adjust the amount of air passing from the plenum chamber through said corresponding separate air passage to the associated separate orifice.

5. An air ring according to claim 4 wherein the plenum chamber supplies air through the annular passage to two annular orifices which in use of the air ring are adjacent to and surround the hot tubular film.

* * * * *